United States Patent [19]

Stebbing

[11] Patent Number: 5,322,544
[45] Date of Patent: Jun. 21, 1994

[54] MELTING A MIXTURE OF SCRAP METAL USING SCRAP RUBBER

[75] Inventor: Franklin L. Stebbing, Norfolk, Nebr.

[73] Assignee: Nucor Corporation, Charlotte, N.C.

[21] Appl. No.: 15,350

[22] Filed: Feb. 8, 1993

Related U.S. Application Data

[63] Continuation-in-part of Ser. No. 891,276, May 29, 1992, abandoned.

[51] Int. Cl.$^5$ ................................. C21C 7/00
[52] U.S. Cl. ........................... 75/10.66; 75/958
[58] Field of Search .................... 75/10.66, 958

[56] References Cited

U.S. PATENT DOCUMENTS

| | | | |
|---|---|---|---|
| 3,812,620 | 5/1974 | Titus et al. | 75/414 |
| 4,014,681 | 3/1977 | Rhinehart | 75/581 |

*Primary Examiner*—Melvyn J. Andrews
*Attorney, Agent, or Firm*—Joseph J. Kelly

[57] ABSTRACT

This invention relates to the melting of scrap metal containing steel in an electric arc furnace using whole scrap rubber tires as an additional source of heat. Also, scrap rubber may be pylarized to form combustibles which are fed into the electric arc furnace for combustion.

12 Claims, 1 Drawing Sheet

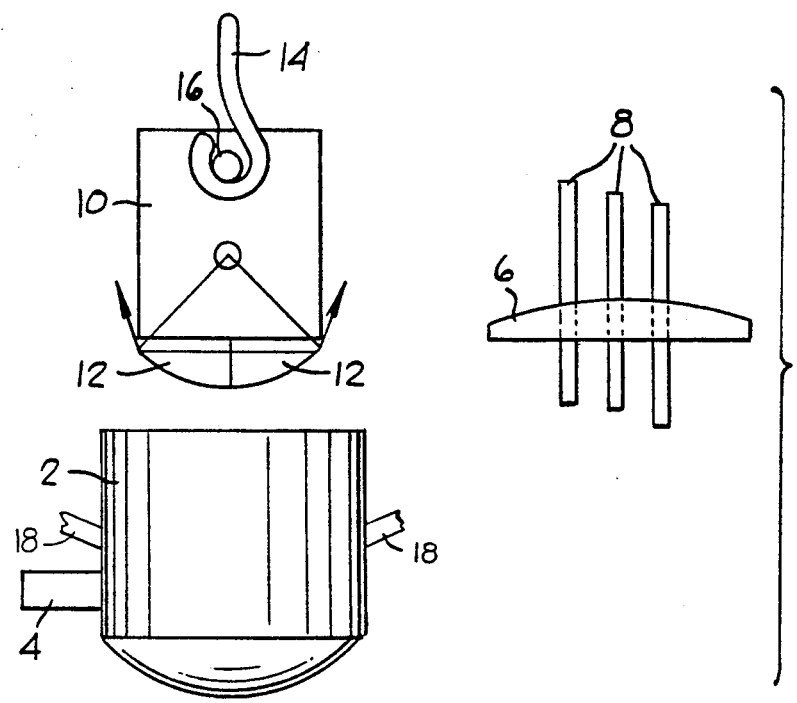
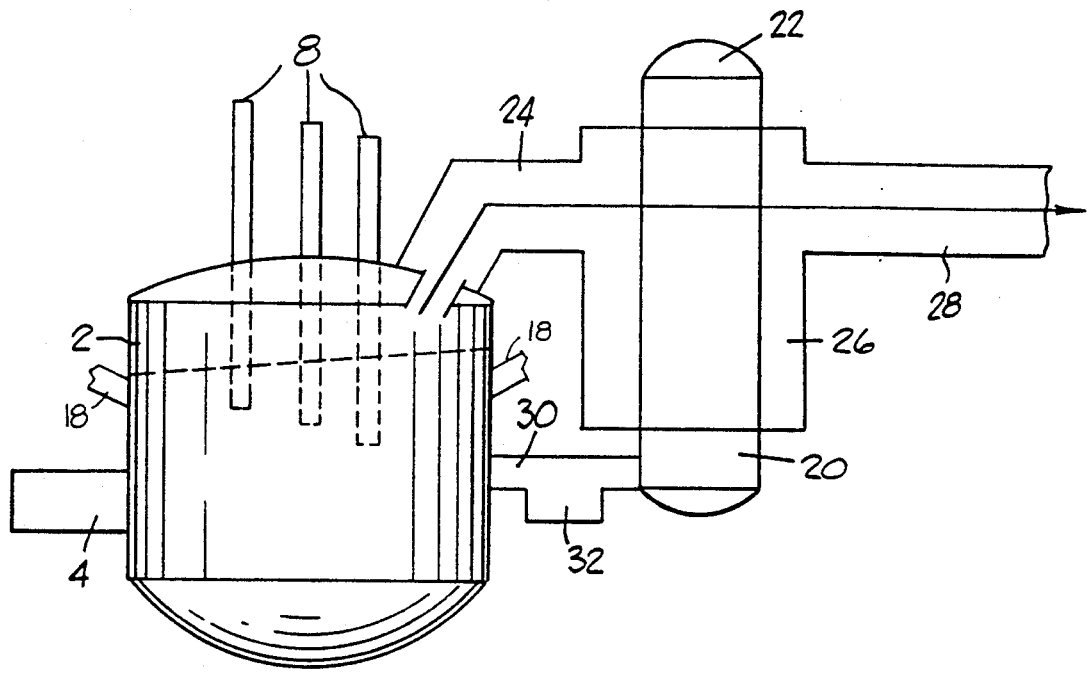

MELTING A MIXTURE OF SCRAP METAL USING SCRAP RUBBER

This application is a continuation-in-part of U.S. patent application Ser. No. 891,276 filed May 29, 1992 for Melting A Mixture of Scrap Metal Using Scrap Rubber now abandoned.

FIELD OF THE INVENTION

This invention relates generally to the manufacturing of steel in a furnace and more particularly to the manufacturing of steel from scrap metal in a furnace using scrap automotive tires as an auxiliary heat supplying source.

BACKGROUND OF THE INVENTION

Scrap automotive tires present an environmental problem and recycling is practically non-existent. Tires do not degrade in landfills and when stockpiled, create a major fire hazard that is impossible to extinguish once ignited. Since they have about the same heating value as coke, 15,000 BTU's per pound, a tire weighing about 20 pounds has approximately 300,000 BTU's. The scrap automotive tires are so plentiful that they have a near zero cost. At the present time, scrap automotive tires are being used as fuel or auxiliary fuel in a variety of operations such as cement kilns, coal fired generators and other applications wherein a controlled firing rate is used. In such instances, it is often necessary to shred the scrap automotive tires prior to using in a furnace. Also, when the scrap automotive tires contain steel belts, it is often necessary to remove the steel belts. In some instances, whole rubber tires have been used but such use required equipment changes that reduced the cost advantages. In the manufacturing of steel from scrap metal, some of the steel mills add coke to the scrap metal that is melted in a furnace such as an electric arc furnace.

BRIEF DESCRIPTION OF THE INVENTION

This invention relates to a method for melting steel using scrap metal and at least about 0.25 percent by weight of scrap rubber, such as scrap automotive tires, wherein scrap metal and whole scrap rubber tires are deposited in a steel melting furnace, such as an electric arc furnace, and the whole scrap rubber tires are combusted with air or oxygen to provide an auxiliary source of heat to melt the scrap metal.

In the preferred embodiment of the invention, an electric arc furnace is used. In the preferred method, a quantity of scrap metal is deposited in the electric arc furnace and heat is applied thereto to form a molten pool of metal. The scrap metal is the conventional scrap metal used to make steel. A quantity of scrap rubber, preferably whole scrap rubber tires, in an amount of at least 0.25 percent by weight, is then loaded into a bottom opening bucket and another quantity of scrap metal is loaded into the bucket on top of the whole scrap rubber tires and then the bottom is opened and the whole rubber tires fall into the electric arc furnace followed by the scrap metal. If desired, some of the whole scrap rubber tires could be included in the first quantity of scrap metal melted in the furnace. In addition to the electrodes, the furnace may have oxygen/air blow pipes or oxygen/natural gas burners to assist in the melting of the scrap metal and in the combustion of the whole scrap rubber tires. The whole scrap rubber tires ignite and are combusted to add auxiliary heat to the furnace. Once the whole scrap rubber tires are ignited, the natural gas is turned off and the oxygen is available for the combustion of the whole scrap rubber tires. The electrodes in the electric arc furnace continue to operate and function to control the temperature in the furnace. Additional charges of scrap metal or scrap metal and scrap rubber are subsequently added into the furnace until its capacity has been obtained. The temperature in the furnace is the temperature normally used in the making of steel from scrap metal which is about 2950 degrees Fahrenheit.

In another preferred embodiment of the invention, a container for the pyrolysis of the scrap whole, or cut, or shredded and de-wired rubber tires is located adjacent to an electric arc furnace. Hot exhaust gases from the electric arc furnace are fed into a jacket surrounding the container to heat the whole, cut or shredded and de-wired rubber tires and convert them to combustible liquids and gases. Suitable control means are provided to feed the resulting combustibles into the electric arc furnace to function as an auxiliary source of heat during the combustion thereof.

BRIEF DESCRIPTION OF THE DRAWING

Illustrative and presently preferred embodiments of the invention are shown in the accompany drawing in which:

FIG. 1 is a schematic illustration of apparatus for use in one preferred embodiment of the invention; and FIG. 2 is a schematic illustration of apparatus for use in another preferred embodiment of the invention.

DETAILED DESCRIPTION OF THE INVENTION

In FIG. 1, there is illustrated an electric arc furnace 2 of the type generally used in a manufacturing operation to convert scrap metal into steel and is provided with a during spout 4. The roof 6 with the electrodes 8 has been raised and swung aside. A charging bucket 10 having bottom doors 12 has been positioned over the electric arc furnace 2 and is supported by a pair of hooks 14 (only one shown) engaging outward projecting integral studs 16 (only one shown). The hooks 14 are part of a conventional crane (not shown) which moves the charging bucket 10 to the position over the electric arc furnace. Oxygen/natural gas burners 18 extend through the sidewall of the electric arc furnace and are used to assist in the melting of the scrap metal and the ignition of whole scrap rubber tires as described below. Once the whole scrap rubber tires have been ignited, the natural gas is turned off and the oxygen is available for the combustion of the whole scrap rubber tires.

In a preferred process of this invention, a first quantity of scrap metal (not shown) of the type conventionally used in the manufacture of steel from scrap metal has been loaded into the charging bucket 10 and moved to the position illustrated in FIG. 1. The scrap metal is then dropped into the electric arc furnace 2. The charging bucket 10 is then removed and the roof 6 with the electrodes 8 are moved to an operating position in the electric arc furnace 2. An electric current is supplied to the electrodes 8 and the oxygen/natural gas burners 18 are ignited to generate heat to melt the scrap metal. In one example of the process using an electric arc furnace having a capacity of 100,000 pounds, the first quantity of scrap metal comprised 30,000 pounds.

During the melting of the first quantity of scrap metal, the charging bucket 10 is loaded with a second quantity of materials. The second quantity of materials comprises a first quantity of whole scrap rubber tires which are first loaded into the charging bucket and a second quantity of scrap metal is loaded into the charging bucket on top of the whole scrap rubber tires. In some instances, a cut may be made to remove water from a whole scrap rubber tire. The roof 6 with the electrodes 8 is raised and swung aside. The charging bucket 10 is moved to a position over the electric arc furnace 2 and the bottom doors 12 are opened to drop the whole scrap rubber tires followed by the additional scrap metal into the electric arc furnace 2. The charging bucket is moved out of the way and the roof 6 with the electrodes 8 is moved back onto the electric arc furnace 2. The heat of the molten scrap metal in the electric arc furnace 2 and the heat generated by the electrodes 8 together with the oxygen/natural gas burners 18 in the furnace function to ignite the whole scrap rubber tires and their combustion with air or oxygen functions to produce auxiliary heat to heat the additional scrap metal as it rises through the additional scrap metal. The electrodes 8 continue to operate to control the temperature of the molten material and to assist in the melting of the additional scrap metal but the power supplied to the electrodes 8 is reduced as a result of the heat generated by the combustion of the whole scrap rubber tires. As stated above, once the whole scrap rubber tires have been ignited, the natural gas is turned off and the oxygen is available for the combustion of the whole scrap rubber tires. If the electric arc furnace 2 is not equipped with oxygen/natural gas burners, a conventional lance or blow pipe may be used to provide the oxygen for the combustion of the whole scrap rubber tires. In accordance with the example described above, the second quantity of materials comprises about 500 pounds of whole scrap rubber tires and about 30,000 pounds of additional scrap metal. The temperature in the electric arc furnace is the conventional temperature used to melt scrap metal which is about 2950 degrees Fahrenheit. If desired, a quantity of the whole scrap rubber tires, such as about 100 pounds, can be included with the first quantity of scrap metal.

During the melting of the second quantity of scrap metal, a second quantity of materials comprising a second quantity of whole scrap rubber tires and a third quantity of scrap metal is loaded into the charging bucket 10. When the second quantity of scrap metal has been melted, the roof 6 with the electrodes 8 and the charging bucket 10 are moved to drop the third quantity of scrap metal into the electric arc furnace 2, the charging bucket 10 is moved away and the roof 6 with the electrodes 8 are moved back into the operating position. In accordance with the example described above, the second quantity of whole scrap rubber tires is about 500 pounds and the third quantity of scrap metal is about 20,000 pounds.

The process is then repeated to add a third quantity of materials comprising a third quantity of whole scrap rubber tires and a fourth quantity of scrap metal necessary to reach the capacity of the electric arc furnace 2. If the whole scrap rubber tires have steel belts, then the steel in the steel belts becomes part of the molten steel in the electric arc furnace 2. The third quantity of whole scrap rubber tires is in an amount of about 500 pounds.

In the example described above, the second quantity of materials was added to the electric arc furnace 2 about 15 minutes after the current was supplied to the electrodes to commence the melting of the first quantity of scrap metal. The third and fourth quantities of materials are added in successive intervals spaced about 15 minutes apart. After about another 15 minutes, normal refining processes are performed on the molten metal to obtain desired characteristics. It is to be understood that the foregoing example is only an example and that other quantities of scrap metal and whole scrap rubber tires and other sizes of furnaces may be used.

Whole scrap rubber tires are preferred so as to control the combustion thereof. If shredded scrap rubber tires were to be used, the combustion would occur too rapidly and generate an undesirable amount of heat. Also, it is possible that the combustion of the shredded scrap rubber tires would be so quick that fumes could escape from the electric arc furnace 2 before the roof 6 could be replaced.

Apparatus for practicing another preferred embodiment of the invention is schematically illustrated in FIG. 2 wherein apparatus similar to that in FIG. 1 have been given the same reference numerals. A container 20 is mounted at a fixed location by conventional mounting means (not shown) so that it is close to the electric arc furnace 2 and has a removable cover 22. A fume collecting duct 24 is in fluid communication with the interior of the electric arc furnace 2 so that the heated gaseous materials in the electric arc furnace 2 pass through the fume collecting duct 24. A jacket 26 surrounds a major portion of the container 20 and is in fluid communication with the fume collecting duct 24 so that the heated gaseous materials flow around the container 20. A conduit 28 is in fluid communication with the jacket 26 and a dust collector (not shown) to allow for passage of the heated gaseous materials through the jacket 26 to the dust collector. A pipe 30 extends between and is in fluid communication with the container 20 and the electric arc furnace 2 and has a flow control valve 32 located therein.

In practice, a quantity of whole, cut or shredded and de-wired rubber tires (not shown) is deposited into the container 20 and the hot gaseous materials passing through the jacket 26 are used to heat the whole, cut or shredded and de-wired rubber tires to form combustible liquids and gases. The combustible liquids and gases flow through the pipe 30 to be combusted in the electric arc furnace 2. The flow of the melted rubber into the electric arc furnace 2 is controlled by the flow control valve 32.

It is contemplated that the inventive concepts herein described may be variously otherwise embodied and it is intended that the appended claims be construed to include alternative embodiments of the invention except insofar as limited by the prior art.

What is claimed is:

1. A process for melting scrap metal for producing steel comprising:
    combining a quantity comprising scrap metal containing steel and at least about 0.25 percent by weight of scrap rubber in an electric arc furnace;
    said scrap rubber comprising whole scrap rubber tires; and
    applying energy to said quantity in said furnace to start the combustion of said scrap rubber to add additional heat for melting said scrap metal containing steel.

2. The process as in claim 1 and further comprising:

using oxygen/natural gas burners to supply a portion of said energy.

3. The process as in claim 2 and further comprising:
turning off said natural gas but continuing the supply of oxygen once said whole scrap rubber tires have been ignited.

4. The process as in claim 1 wherein:
at least a plurality of said whole rubber tires comprise steel belted rubber tires.

5. A process for melting scrap metal for producing steel comprising:
depositing a quantity of scrap metal containing steel into an electric arc furnace;
applying energy to said scrap metal containing steel to commence the melting of said scrap metal containing steel;
depositing an additional quantity of scrap metal containing steel and at least about 0.25 percent by weight of scrap rubber onto said melting scrap metal in said furnace;
said scrap rubber comprising whole scrap rubber tires; and
causing combustion of said scrap rubber to add additional heat for melting said scrap metal containing steel.

6. The process as in claim 5 and further comprising:
using oxygen/natural gas burners to supply a portion of said energy.

7. The process as in claim 6 and further comprising: turning off said natural gas but continuing the supply of oxygen once said whole scrap rubber tires have been ignited.

8. The process as in claim 5 and further comprising:
depositing additional scrap rubber in a container;
applying heat to said container to convert said additional scrap rubber to combustibles; and
depositing said combustibles into said electric arc furnace for combustion thereof.

9. The process as in claim 5 wherein said step of depositing an additional quantity of scrap metal and at least about 0.25 percent by weight of scrap rubber comprises:
depositing said scrap rubber into a bottom opening bucket;
depositing said additional quantity of scrap metal on top of said scrap rubber;
moving said bottom opening bucket over said electric arc furnace; and
opening said bottom of said bucket so that said scrap rubber is the first to fall into said electric arc furnace.

10. The process as in claim 9 and further comprising:
using oxygen/natural gas burners to supply a portion of said energy.

11. The invention as in claim 10 and further comprising:
turning off said natural gas but continuing the supply of oxygen once said whole scrap rubber tires have been ignited.

12. The invention as in claim 5 and further comprising: including a quantity of scrap rubber with said quantity of scrap metal.

* * * * *